US012627514B2

(12) United States Patent
Swaminathan

(10) Patent No.: US 12,627,514 B2
(45) Date of Patent: May 12, 2026

(54) EVENT-LOCKED MESSAGES WITH PROVABLE ATTESTATION

(71) Applicant: Kishore Swaminathan, Willowbrook, IL (US)

(72) Inventor: Kishore Swaminathan, Willowbrook, IL (US)

( * ) Notice: Subject to any disclaimer, the term of this patent is extended or adjusted under 35 U.S.C. 154(b) by 524 days.

(21) Appl. No.: 17/979,328

(22) Filed: Nov. 2, 2022

(65) Prior Publication Data

US 2023/0171115 A1     Jun. 1, 2023

Related U.S. Application Data

(60) Provisional application No. 63/283,959, filed on Nov. 29, 2021.

(51) Int. Cl.
*H04L 29/06*          (2006.01)
*H04L 9/08*           (2006.01)
*H04L 9/32*           (2006.01)

(52) U.S. Cl.
CPC .......... *H04L 9/3297* (2013.01); *H04L 9/0825* (2013.01); *H04L 9/3249* (2013.01); *H04L 9/3263* (2013.01)

(58) Field of Classification Search
None
See application file for complete search history.

(56) References Cited

U.S. PATENT DOCUMENTS

| | | | | | |
|---|---|---|---|---|---|
| 11,159,313 | B2 * | 10/2021 | Fletcher | ................ | H04L 9/0847 |
| 11,985,112 | B2 * | 5/2024 | Kapp | .................. | H04L 63/0428 |
| 12,418,410 | B2 * | 9/2025 | Racz | .................... | G08B 13/196 |

| | | | | | |
|---|---|---|---|---|---|
| 2016/0360402 | A1 * | 12/2016 | Park | .................... | H04L 63/0428 |
| 2016/0364928 | A1 * | 12/2016 | Woodard | ................ | G07F 9/001 |
| 2018/0062852 | A1 * | 3/2018 | Schmahmann | ...... | G06Q 10/101 |
| 2019/0020629 | A1 * | 1/2019 | Baird, III | ............. | H04L 9/3297 |
| 2019/0229902 | A1 * | 7/2019 | Zheng | .................. | H04L 9/0861 |
| 2019/0260718 | A1 * | 8/2019 | Buendgen | ............ | H04L 9/0822 |
| 2019/0378142 | A1 * | 12/2019 | Darnell | .............. | H04L 63/0861 |
| 2019/0392407 | A1 * | 12/2019 | Keskar | ................ | G06Q 20/363 |
| 2020/0136815 | A1 * | 4/2020 | Trevethan | ............ | H04L 9/3297 |
| 2020/0220719 | A1 * | 7/2020 | Chaudhari | ........... | H04L 9/0822 |
| 2020/0304289 | A1 * | 9/2020 | Androulaki | .......... | H04L 9/0637 |
| 2021/0091934 | A1 * | 3/2021 | Fletcher | ............... | H04L 9/0847 |
| 2021/0110328 | A1 * | 4/2021 | Hsiao | .................. | G06F 16/2477 |
| 2021/0135859 | A1 * | 5/2021 | Barraza Enciso | .... | H04L 9/0869 |
| 2021/0136102 | A1 * | 5/2021 | Bendiabdallah | ...... | H04W 88/00 |

(Continued)

OTHER PUBLICATIONS

Rivest, Ronald L., Shamir, Adi, and Wagner, David A., "Time-lock Puzzles and time-release Crypto," Technical Report, MIT, 1996.

(Continued)

*Primary Examiner* — Eleni A Shiferaw
*Assistant Examiner* — Hassan A Hussein

(57)          ABSTRACT

Described herein is an Event Locking System (ELS) and its associated methods for (a) cryptographically locking a given piece of information until a certain time or the occurrence of a certain event and (b) providing an attestation of both the lock time and the locked content to prove that the information has not been accessed or tampered with since the lock time. Applications for such a system abound: from sealed bids for auctions and tenders, sports betting, elections, archiving of sensitive information, securing legal documents, and so on.

18 Claims, 9 Drawing Sheets

(56) References Cited

U.S. PATENT DOCUMENTS

| | | | | |
|---|---|---|---|---|
| 2021/0184840 | A1* | 6/2021 | Yeo | H04L 63/06 |
| 2021/0256150 | A1* | 8/2021 | Bayon | H04L 63/062 |
| 2021/0352083 | A1* | 11/2021 | Oberhauser | G11B 20/00086 |
| 2022/0376928 | A1* | 11/2022 | Wang | H04L 9/14 |
| 2023/0073337 | A1* | 3/2023 | Chan | G06Q 20/405 |
| 2023/0308282 | A1* | 9/2023 | Toshimitsu | G06Q 10/10 |
| 2024/0161108 | A1* | 5/2024 | Madisetti | G06Q 20/389 |
| 2024/0179003 | A1* | 5/2024 | Bayon | H04L 9/0869 |
| 2024/0414163 | A1* | 12/2024 | Gagliardoni | H04L 63/101 |
| 2024/0428237 | A1* | 12/2024 | Mukherji | G06Q 20/386 |
| 2024/0430244 | A1* | 12/2024 | Ugus | H04L 63/062 |
| 2025/0247215 | A1* | 7/2025 | Badrinarayanan | H04L 9/085 |

OTHER PUBLICATIONS

Bellare, Mihir, and Goldwasser, Shafi, "Verifiable partial key escrow,"
Proc. of the 4th Conference on Computers and Communications
Security, 1997.
Mahmoody, M., Moran, T., Vadhan, S. (2011). Time-Lock Puzzles
in the Random Oracle Model. In: Advances in Cryptology—
CRYPTO 2011. Lecture Notes, vol. 6841. Springer, 2011.
Liu, Jia, Jager, Tibor, Kakvi, Saqib A., and Warinschi Bogdan,
"How to build time-lock encryption," vol. 86, issue 11, ACM
Digital Library, 2018.
Smith, Wesley, "Towards Timelock Encryption," Technical Report,
University of Ediburgh School of Informatics, 2019.
Jaques, S., Montgomery, H., Rosie, R., Roy, A. (2021). Time-
Release Cryptography from Minimal Circuit Assumptions. Lecture
Notes in Computer Science, vol. 13143. Springer, 2021.

\* cited by examiner

Event Owners

Applications

<u>Locking</u>          <u>Unlocking</u>

A. Standalone Monolithic ELS
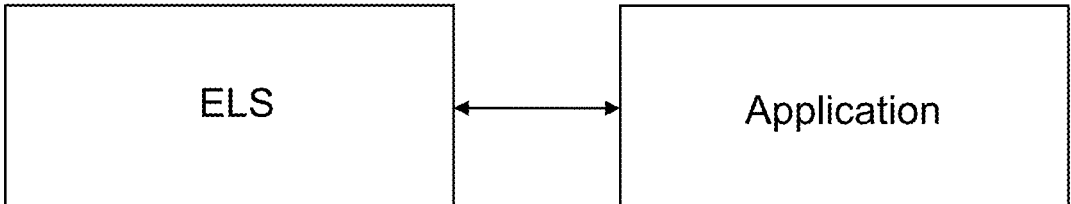
B. ELS components integrated into Application
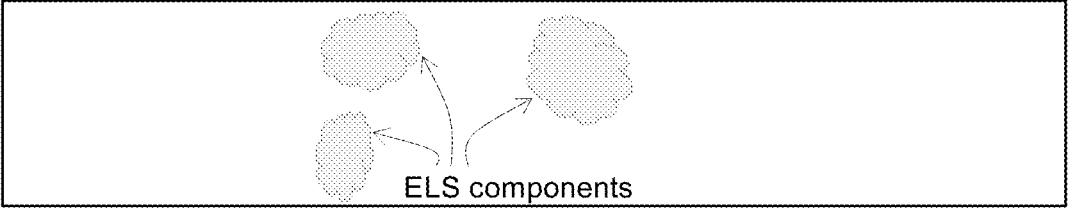
C. Distributed ELS serving one application and customers via APIs
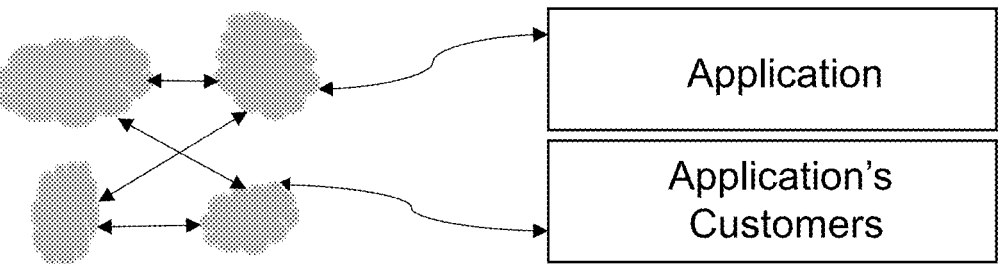
D. Standalone distributed ELS serving multiple parties
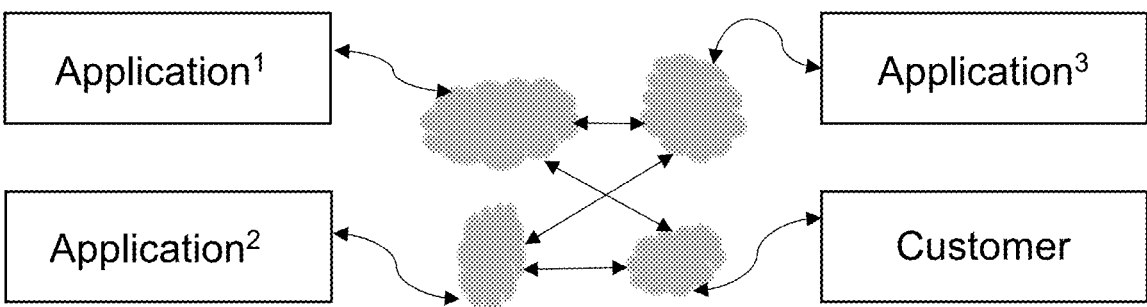
Fig. 05

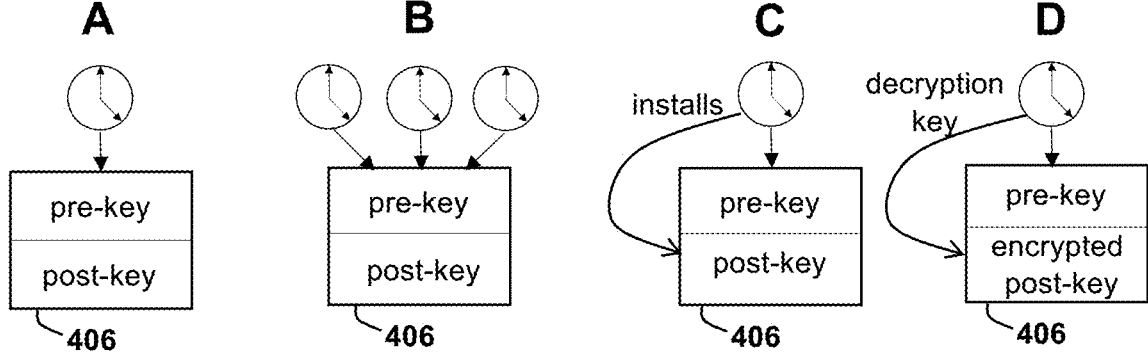

```
register_timed_event('1697122800') =>
    {    "type": "timed_event",
         "token": "t_1697122800",
         "locked": true,
         "occurs_at": "2023-10-12 10:00:00 CDT"    }
```
602

A  |  B  |  C  |  D installs  |  decryption key pre-key / post-key  406
pre-key / post-key  406
pre-key / post-key  406
pre-key / encrypted post-key  406

Fig. 06

```
register_signaled_event('prompt_server') =>
    {    "type": "signaled_event",
         "token": "s_635577bd784e0",
         "locked": true,
         "signaled_at": null,
         "owner": "prompt_server",
         "signal_key":
                    "FtWNyQoYnVme3LCiTpoeX60JQII4ynEH" }
```
702

E  |  F  |  G  |  H

Owner
Bearer
decryption key  Owner pre-key / post-key  406
pre-key / post-key  406
pre-key / post-key  406
pre-key / encrypted post-key  406

Fig. 07

Event Locking   Event Unlocking

Figures 09, 10:
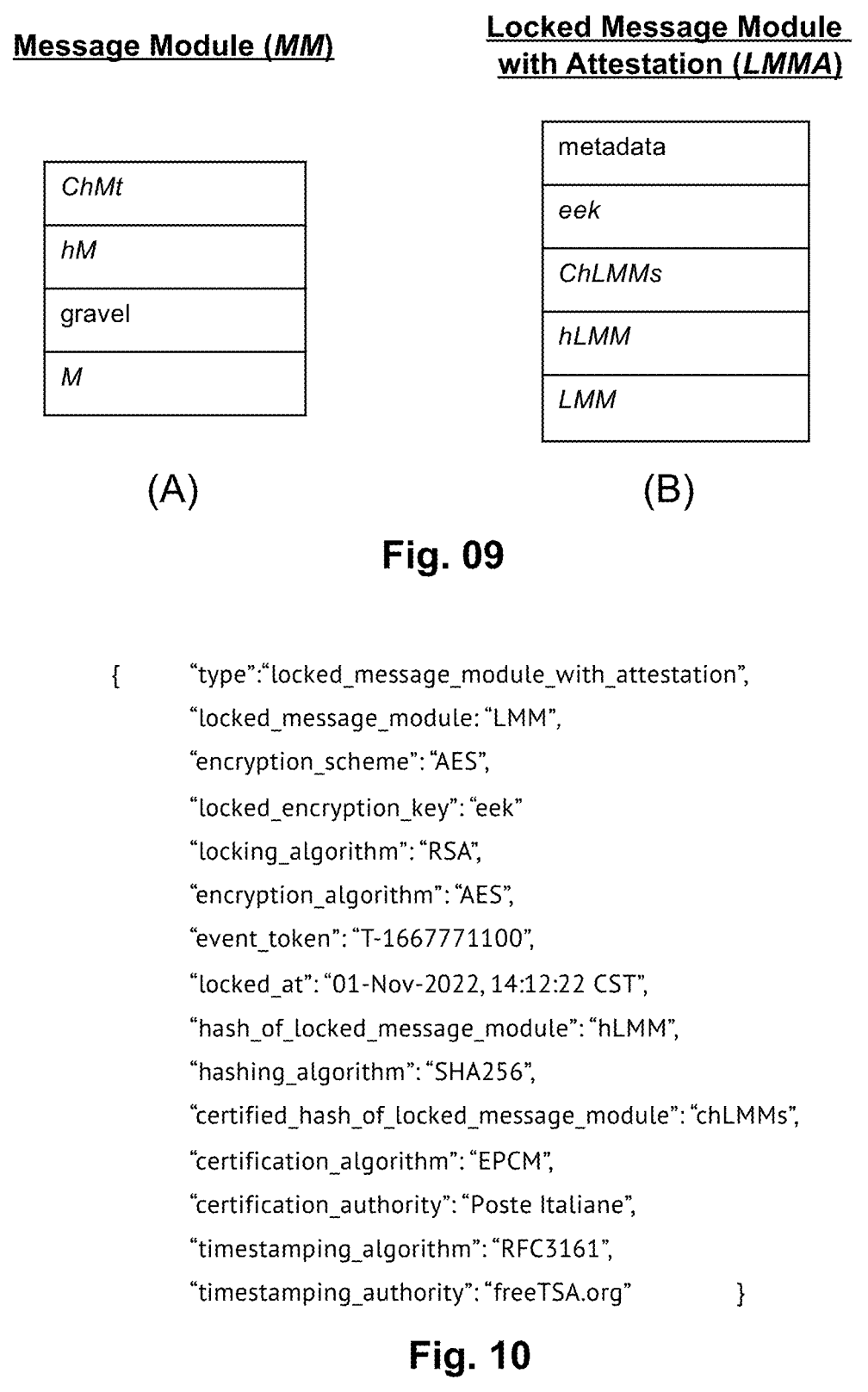

Message Module (_MM_)

| |
|---|
| _ChMt_ |
| _hM_ |
| gravel |
| _M_ |

Locked Message Module with Attestation (_LMMA_)

| |
|---|
| metadata |
| _eek_ |
| _ChLMMs_ |
| _hLMM_ |
| _LMM_ |

{     "type":"locked_message_module_with_attestation",

"locked_message_module: "LMM",

"encryption_scheme": "AES",

"locked_encryption_key": "eek"

"locking_algorithm": "RSA",

"encryption_algorithm": "AES",

"event_token": "T-1667771100",

"locked_at": "01-Nov-2022, 14:12:22 CST",

"hash_of_locked_message_module": "hLMM",

"hashing_algorithm": "SHA256",

"certified_hash_of_locked_message_module": "chLMMs",

"certification_algorithm": "EPCM",

"certification_authority": "Poste Italiane",

"timestamping_algorithm": "RFC3161",

"timestamping_authority": "freeTSA.org"         }

Fig. 10 by 404

```
                                                                    1502
{      "action":"event-creation",
       "event": event-token,
       "pre-key": pre-key,
       "encrypted-post-key": encrypted-post-key,
       "encryption-key-deposited-with": "timelock6" ,
       "post-key-encrypted-encryption-key": k1              }
``` by 406

```
                                                                    1504
{      "action":"event-creation",
       "event": event-token,
       "pre-key": pre-key,
       "encrypted-post-key": encrypted-post-key              }
``` by 408

```
                                                                    1506
{      "action":"encryption-key-received",
       "event": event-token
        "encrypted-post-key":  encrypted-post-key            }
```

Fig. 15 by 408

```
                                                                    1602
{      "action": "event-signaled",
       "event": event-token,
       "signed-encryption-key": encryption key for post key signed by
               Timelock
       "acknowledgment": signed acknowledgment by event manager   }
``` by 406

```
                                                                    1604
{      "action": "post-key-released",
       "event": event-token,
       "post-key": post-key,
       "signed-encryption-key received": encryption key for post key signed
               by Timelock                                    }
```

Fig. 16

EVENT-LOCKED MESSAGES WITH PROVABLE ATTESTATION

CROSS-REFERENCE TO RELATED APPLICATIONS

The present application claims the benefit of Provisional Patent Application U.S. 63/283,959 titled "Event Locked Messaging with Provable Attestation" which is incorporated by reference herein in its entirety.

FIELD OF INVENTION

This invention is in the fields of information security. It describes systems and methods for cryptographically locking information until a certain time or event.

BACKGROUND FOR THIS INVENTION

Time capsules are a well-known physical means for locking information away until a specified time, though the creator of a time capsule has no way to enforce when the capsule can be opened or proving that it has not been altered after it was sealed. Auctions and tenders require sealed bids that will be opened at a specified time, with the promise that the best bid will be the winner, though neither the bidders nor the auctioneers can reliably prove when the bids were sealed or opened, nor be sure that the bids were safe from prying eyes until they were opened. Today, billions of dollars are at stake at sport betting events—legal and illegal—where the bets are taken online or over the phone and a bettor has little recourse against the word of a bookie. Other examples include sealed letters that may contain a will or a grant of power-of-attorney to a next of kin in case of death or disablement. Physical mechanisms such as locks or combination safes are one solution, but they store the information in unencrypted form; anyone who gains access can read or copy the information, potentially without leaving a trace.

It is therefore necessary to have a reliable cryptographic mechanism for locking information until a specified time and/or the occurrence of a specified event. Such a mechanism, to be credible and useful, must also enable an unlocker to ascertain the time at which the information was locked, and that the information has not been altered since.

A real-life scenario may be useful for motivating the need for event locking: imagine an election agency that uses electronic voting machines to conduct elections across many precincts. On election day, after the last vote is cast in a machine, the machine is locked till, say, 9:00 am the next morning and transported to a central location. At precisely 9:00 am the next morning, all machines are unlocked in front of the public and tallying of the votes begins. To be credible, the election agency must be able to prove that the voting database of each machine was sealed from both access and modification after the last vote, and that when the machine is unlocked the next morning, the database is the same one that was locked the previous day (i.e., it has not been swapped or replaced).

Locking information with respect to time is not a new problem in cryptography and has been addressed before: the problem was originally posed in 1993 as "sending a message to the future" which became known as "time-release crypto" problem in academia. Over the next several years, researchers recognized that this is a non-trivial problem, there are no "universal" solutions, and any solution requires assumptions and specific usage models. Over the years, the problem has been approached from at least two distinct perspectives: from a purely computational complexity perspective (typically posed as a puzzle where the time complexity of solving the puzzle is greater than the time complexity of constructing the puzzle), and from a trusted-agent perspective, where a trusted third party holds the message or an encryption key until the specified time. Interest in the problem has waned over time since neither a universal solution, nor a general solution to a high-value instance of the problem have been found, although several solutions for specific instances of the problem have been proposed. Some notable early proposals include references [1] and [2]; some of the more recent proposals are references [3] [4] [5] and [6]. To the best of this inventor's knowledge, in patent literature, an invention that addresses event-locking is that of Fletcher [7] that teaches event-lock encryption in a proof-of-work blockchain where a "congress" of users with sufficient voting power can act as an oracle to decide that an event has occurred can compute a decryption key.

This invention has many unique features: specifically, the notion of time is generalized into a notion of events (where time is just one kind of events, signaled by a clock). Second, a locked message is associated with an "attestation": a certified timestamp of when it was locked and a proof of the locked content, enabling anyone to ascertain that the message has not been altered since it was locked. Third, this invention can be implemented using Web3 architecture as distributed applications (dApps) so that it caters to scenarios where trust is critical.

BRIEF DESCRIPTION OF THIS INVENTION

This invention describes systems and associated methods for cryptographically locking a given piece of information (a "message") until a specific time or the occurrence of a specific event. For this purpose, an event is constituted as an asymmetric cryptographic keypair: a pre-key and a post-key such that any message locked with the pre-key can only be unlocked with the corresponding post-key. The Event Locking System (ELS) manages events and their pre- and post-keys. Events may be registered by any party ("event owner") and their keys requested by any party. Pre-keys are freely dispensed, whereas post-keys are available only if the corresponding event has "occurred." Each event has a unique identity ("event token") by which it can be referenced.

Clock events such as "21 Nov. 2023, 12:01 UTC" are considered owned by one or more standard clocks ("time-locks") that signal their occurrence. Non-clock events (e.g., "the Eagle has landed") are signaled by their event owners or one or more designated oracles.

Any party ("application" or "client") may request the ELS that a message be locked to an event by providing a message and identifying the event by its event token. The Event Locker component of the ELS locks the message to the event and provides a proof ("attestation") that will enable an interested party, on unlocking the message, to reliably ascertain when the message was locked and that it has not been altered since it was locked. In some embodiments, the attestation serves as a proxy for the message itself, thereby avoiding exposing the locked message to any third parties or antagonists who may have an incentive to break the event-lock. After the message is unlocked, interested parties ("unlockers") can verify that the message tallies with its attestation. FIG. 01 and FIG. 02 provide a high-level overview of event-locking with provable attestation.

To make the above description concrete, we provide a brief overview of a sports betting application that uses an embodiment of this invention for event locking and attestation. In this application, an operator of sports bets (bookmaker) creates a prompt such as "Who will win the football game between the Packers and the Lions on Nov. 6, 2022?", registers a clock event "Nov. 6, 2022, 15.45 CST" (expected end time of the game) and associates the prompt with the registered event. ELS generates a unique token such as T-1667771100 for identifying this event. As an event, the token has a pre-key for locking bets to that token, and a post-key for unlocking bets locked to that token.

Bettors betting on the Packers-vs-Lions game create their bets (i.e., their predictions of which team will win the game) and invoke the Event Locker to lock and attest their bets. The Event Locker locks or encrypts their bets with the pre-key of the event T-1667771100 and generates an irrefutable proof of the lock time and the content of the bet as attestation. Now a bettor can associate a wager amount with the attestation and forward the locked bet, wager and the attestation to the bookmaker. Although the bookmaker has all the bets and the wagers, the bookmaker has no access to the content of the bets themselves since they remain locked (encrypted). In some embodiments, the bookmaker may be provided only the attestations while a third-party custodian holds the locked bets, with the attestations serving as proxies for the bets.

At 15.45 CST on Nov. 6, 2022, the Timelock that owns the event T-1667771100 signals that the event has occurred, and the post-key of the event is released. The bookmaker can request the post-key and use it to unlock all the locked messages locked with that event's pre-key. The bookmaker can now verify that the unlocked bets tally with their corresponding attestations. Since the wagers are associated with the attestations which in turn are associated with the bets, the bookmaker now knows who predicted what and wagered how much, from which the bookmaker can calculate each bettor's reward. The rewards can even be time sensitive (e.g., early bettors get bigger rewards) since the attestations can prove when each bet was locked.

Please note that this invention is not concerned with betting or how rewards are calculated, and the sports betting example is used only as an illustration of how this invention enables event-locking with provable attestation. Examples are provided for concreteness and should not be used for defining or limiting the scope of this invention.

LIST OF FIGURES

FIG. 01 provides a high-level overview of ELS, event owners, applications and event clients.

FIG. 02 provides a high-level overview of event locking and unlocking.

FIG. 05 depicts some structural combinations with which an ELS may serve applications.

FIG. 06 depicts some possible embodiments for implementing a timed event.

FIG. 07 depicts some possible embodiments for implementing a signaled event.

FIG. 09 depicts a Message Module (MM) and a Locked Module with Certificate (LMMA).

FIG. 10 depicts the kind of information that could be in the metadata of an LMMA.

FIG. 15 depicts log entries created by Embodiment Z during event registration.

FIG. 16 depicts log entries created by Embodiment Z during event signaling.

DETAILED DESCRIPTION OF THIS INVENTION

Figure 1:
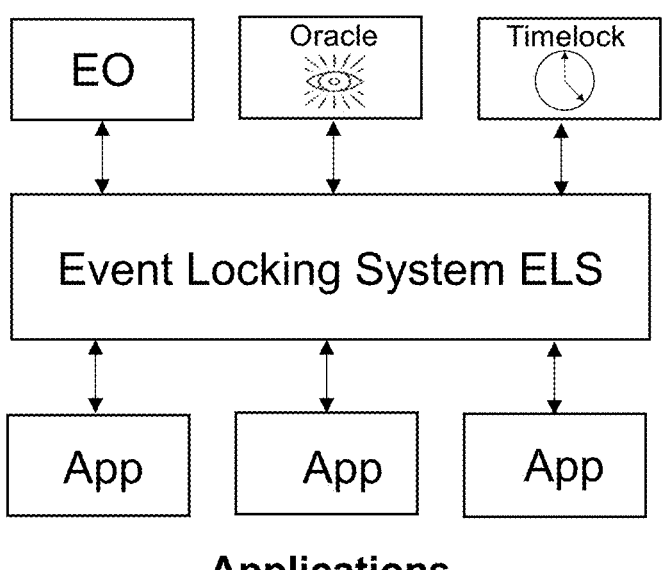
Figure 2:
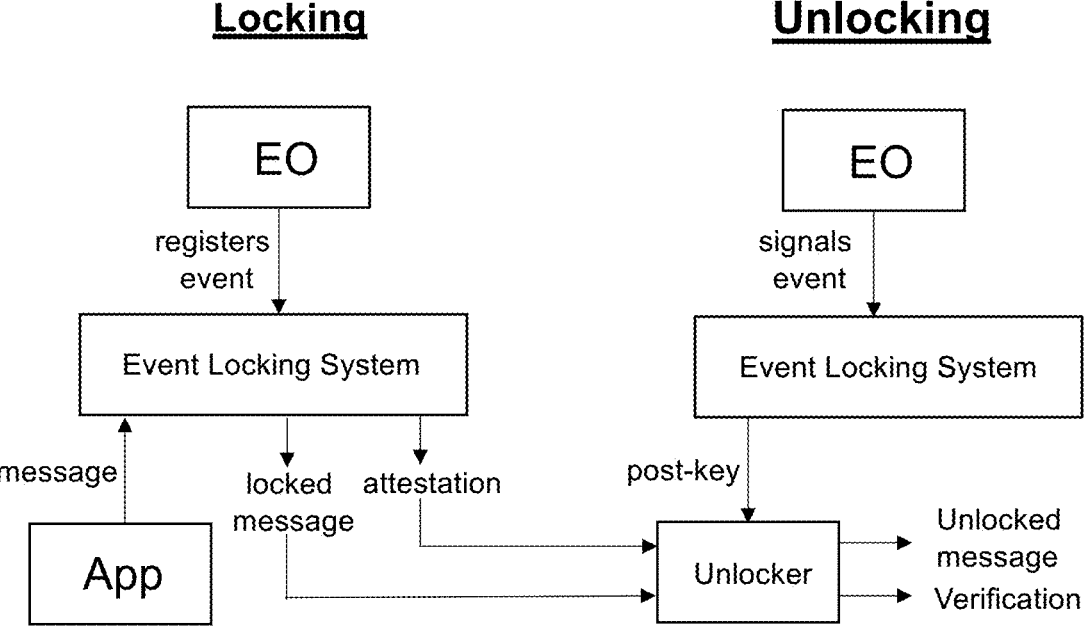
Figure 3:
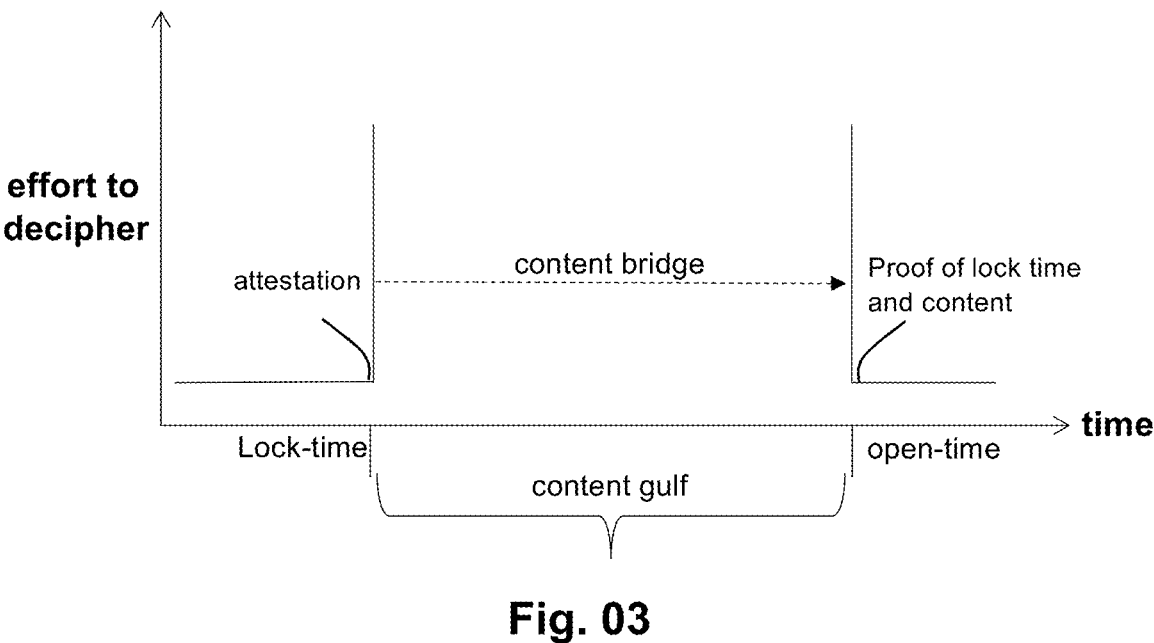
FIG. 03 depicts the conceptual problem solved by this invention.

The problem addressed in this invention is succinctly depicted in FIG. 03. A given piece of information (a "message") needs to remain locked until a specified time or until the occurrence of a specified event. After the event has occurred, the message is unlocked and available to any authorized party. We refer to the time between when the message is locked ("lock time") and when the event occurs ("open time") as the content gulf. During this time, the message is protected from access (read) and modification (write).

Since the information may remain locked for any length of time, there must be a way to prove that the message was not altered while it remained locked. Alternatively, the proof must enable the locker to prove that the content was generated at or before the lock time, was locked at lock time, and has not been altered since. Thus, the proof acts as a content bridge that endures the content gulf and serves as a verification mechanism for the content and its lock time. The content gulf and the content bridge are pictorially depicted in FIG. 03.

Figure 4:
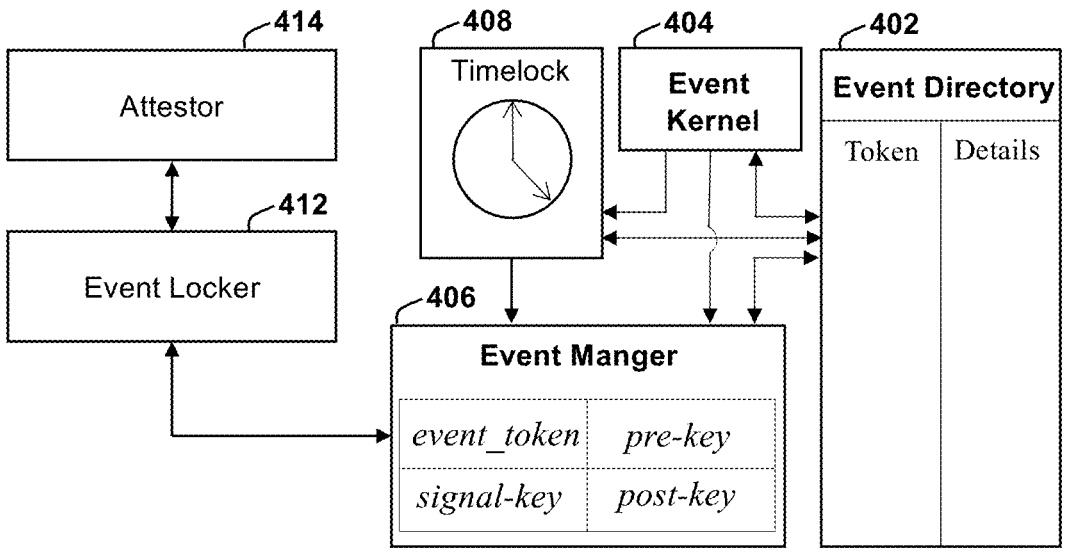
FIG. 04 depicts the functional components that form a typical Event Locking System ELS.

To solve the problem stated above ("the event-locking problem"), we describe an Event Locking System ELS and its associated methods. FIG. 04 is a block diagram that describes the major functional components of an Event Locking System ELS. Before we delve into the details of these components, we note that, typically, event-locking will serve the needs of some application that uses its service; hence, an ELS and its methods can be implemented in different ways, depending on the needs of the application. Some implementation possibilities—by no means exhaustive—are depicted in FIG. 05: ELS as a monolithic application serving a target application as in FIG. 05(A), ELS as a set of functions or methods integrated into the target application as in FIG. 05(B), ELS as a system of distributed applications (dApps) catering to the target application as well as its customers via APIs as in FIG. 05(C), ELS as a standalone, dApps-based publicly accessible system that caters to multiple applications and their customers as in FIG. 05(D) etc. Consequently, the functional blocks depicted in FIG. 04 and described below must not be confused with the structure or architecture of ELS.

Referring to FIG. 04, Event Directory ED 402 is responsible for maintaining a namespace of unique identities ("event tokens") for events. In distributed embodiments with multiple Event Managers 406, event tokens may be generated by a local ED 402 by prefixing the EM's identity to the token, thereby maintaining uniqueness of event tokens across multiple EMs. The Event Directory maintains details of an event such as when it is supposed to occur (in case of clock events), whether it has occurred, who owns the event etc.

The Event Kernel EK 404 is responsible for generating an asymmetric cryptographic keypair pre-key and post-key for an event when it is registered. In simple embodiments, it may be just a function call that calls an RSA or Diffie-Hellman asymmetric key generator and hands over the generated keypair to the Event Manager EM 406. In embodiments where a high degree of trust is required, it may be implemented in one or more dApps or even one or more specialized hardware processors that hand the pre-key and an encrypted version of the post-key to the Event Manager 406, while handing over the encryption key to the event owner or a Timelock 408, so that the post-key is not available to any single party. Some embodiments may have multiple event kernels, and an event owner may designate which event kernel to use.

Event Manager EM 406 is responsible for managing all the sensitive information related to an event including its pre- and post-keys, signal-key etc. EM 406 is described in detail below.

An ELS may have one or more Timelocks 408. In an embodiment with a single Timelock, the Timelock is implicitly made the owner of all clock or timed events. In embodiments with multiple Timelocks, the event owner may designate a specific Timelock as the owner of the event. In some embodiments, multiple Timelocks may need to signal that a clock-event has occurred in order for its post key to be released. Depending on the embodiment, a Timelock may signal the occurrence of a designated time either proactively or on demand. For example, if there is an event with event token et registered for, say, 12 noon tomorrow, a proactive Timelock 408 will, at 12 noon tomorrow, inform or signal EM 406 that event et has occurred. In contrast, an on-demand Timelock 408 waits for the Event Manager 406 to ask if event et has occurred (typically in response to some third-party request for et's post-key). If it is past noon tomorrow, then, the on-demand Timelock 408 signals the occurrence of et. If an application only requires that the ELS not unlock an event before its designated time, an on-demand Timelock may be more efficient since it does not involve polling. However, if an application requires that an event-locked message be unlocked as soon as the event occurs, a proactive Timelock may be more suited.

The Event Locker EL 412 is responsible for taking a message to be locked and locking it with respect to a given event. EL 412 typically creates a locked module LMM that contains additional information besides the locked message.

The Attestor 414 works with Event Locker 412 to generate an attestation or proof for a locked message that enables an unlocker to ascertain that the unlocked message was locked at a specific time and has not been altered since.

Registering Events

Any application ("event owner") may register an event with the ELS. In embodiments where the ELS components are more granular as, say, separate dApps, events may be registered with Event Kernel 404. An event can be a "timed event" that occurs at a specified time, or a "signaled event" that occurs when signaled by a designated party. FIG. 06 depicts event registration. In 602, an application registers a timed event with a timestamp where the timestamp represents a time in the future. The timestamp can also be specified as a string that represents a future time in any common time format. Four different embodiments A, B, C and D of how a timed event could be configured are shown in FIG. 06.

Embodiment A represents a single Event Manager EM 406 and a single Timelock. The event is registered with a unique token, EM 406 is given the event's pre- and post-keys, and the Timelock is made the event's owner. EM 406 dispenses the pre-key for the event freely to anyone who requests it, but not the post-key. When the Timelock's clock ticks the event time, the Timelock signals the event and thence, the event is considered signaled (occurred), and its post-key is freely dispensed. This may be perfectly acceptable for an application where the Event Manager and the Timelock are internal and trusted and there are other mechanisms for discouraging an antagonist from breaking the event lock.

Embodiment B represents a case where the responsibility of event signaling is given to multiple timelocks, potentially on different systems or servers. The Event Manager would not consider the event signaled until a majority—or even all—timelocks have signaled. Such an embodiment could cater to scenarios where compromised system clocks are believed to be a major attack vector for breaking a time-locked message. Alternatively, the multiple timelocks may stand as proxy for credibility and accountability. For example, a timed financial transaction may require that three different banks in different countries sign off on a transaction. Each bank may use its clock as a means of signaling its approval and recording the approval in its logs.

Embodiment C could represent an ELS where the Event Kernel 404 is independent. When a timed event is registered, EK 404 generates an asymmetric cryptographic keypair, and distributes the pre-key to EM 406 and the post-key to a Timelock 408. When the event occurs, Timelock 408 signals the event by installing the post-key in EM 406. This ensures that, an antagonist breaking into EM 406 would not be able to break an event lock since EM 406 does not get the post-keys for events until the event is signaled.

Embodiment D is similar to C, with one difference: when an event is registered, EK 404 generates an asymmetric keypair and distributes the pre-key and an encrypted version of the post-key to EM 406 and distributes the encryption key (with which the post-key is encrypted) to a Timelock 408. When the event occurs, Timelock 408 signals the event by providing EM 406 with the encryption key, which enables EM 406 to decrypt and dispense the post-key to event clients. The advantage of embodiment D over C is that in D, unlike C, Timelock 408 cannot act without the cooperation of the Event Manager 406 since all it has is the encryption key for the post-key, not the post key.

Another kind of event is a "signaled event," shown in 702. In this example, an application (called, say, prompt server) registers an event and is given a signal key with which the event can be signaled. Shown in FIG. 07 are four different embodiments E, F, G and H—by no means exhaustive—to illustrate some possibilities for configuring signaled events.

Embodiment E represents an application registering a signaled event and designating itself as the owner of the event (as in 702). In this case, the event owner alone can signal the event (with the signal key). Typically, to signal the event, the event owner digitally signs the signal key and may be provided a signed acknowledgement by EM 406 so that both parties have a provable record of their mutual communication.

Embodiment F represents a signaled event registered without an owner and has defaulted to an unowned event. In such a case, any bearer of the signal key may be able to signal the event.

In Embodiment G, the event owner has designated a third-party as an oracle to signal the event. An oracle may be an authoritative source that is in charge of reporting on the occurrence of an event. For example, NFL or a TV channel carrying the Superbowl game may signal the beginning of half-time; Nasdaq or Yahoo Finance may be designated as the oracle signaling the price of a stock crossing a certain threshold.

In Embodiment H, on registering a signaled event, the owner is given a signal key, as well as an encryption key for the post-key as in FIG. 06 (D). To signal the event, the owner may be required to provide a signed signal key and the encryption key to EM 406.

These scenarios and configurations illustrate and emphasize that ELS can cater to a wide range of application-specific needs. Later on, we will describe a few embodiments in detail.

Event Locking

Event locking refers to locking a message M with respect to an event. M can be any digital object: a string, arbitrary amount of text, photograph, sound, multimedia or anything at all that can be represented as a digital object. Without loss of generality, we'll assume M is contained in a computer file.

Although an event's asymmetric keys can be directly used for encrypting—and hence locking—a file, asymmetric keys are unwieldy and inefficient for encrypting large amounts of information. Following normal convention in cryptography, we will use a symmetric key ek for encrypting M and use the event's asymmetric keys (pre-key and post-key) for encrypting and decrypting ek. Thus, when we say that a message M is locked to an event e, we refer to the two-step process depicted in FIG. 08: (a) encrypting M (802) with an arbitrary encryption key ek using a symmetric encryption scheme (such as any AES family algorithm) to obtain a locked message LM, and (b) encrypting ek with event e's pre-key using an asymmetric encryption (804) scheme (such as RSA) to obtain an encrypted ek or eek For unlocking, the steps are reversed: (a) eek is first decrypted (814) by the post-key of the event to obtain ek, and (b) LM is decrypted (812) by ek to obtain M Since the post-key is available only after the event has occurred (signaled), we refer to this as unlocking a message that has been locked to an event.

EM 406 typically provides the following functions/APIs for event clients to use:

1. get_pre_key (event_token)⇒pre-key of the event
2. get_post_key (event_token)⇒post_key of the event if and only if the event represented by event_token has occurred (signaled).
3. event_encode (event_token, ek)⇒asymmetric_encrypt (pre-key, ek)
4. event_decode (event_token, eek)⇒asymmetric_decrypt (post-key, eek) if and only if the event has occurred and its post-key is available.

Event Locker 412—or indeed any event client—can lock a message M with these two calls:

1. LM=encrypt(ek, M)
2. eek=event_encode(event_token, ek)

An unlocker can unlock an event-locked message with these two function calls:

1. ek=event_decode(event_token, eek)
2. M=decrypt (eek, LM)

Message Attestation

One of the unique features of the current invention is that the target recipient of an event-locked message ("unlocker") can depend on a proof—provided in the form of an attestation—that the locked message was locked at a certain time and has not been modified since. To be credible, the proof must serve the following goals: (a) it must fully capture the content of the message so that the slightest alteration of the content can render the proof invalid; (b) at the same time, the proof should not provide any clue about the content of the message that would enable an antagonist to definitively guess the content before unlocking the message; (c) it must enable an unlocker to determine precisely when the message was locked from access and modification; and finally, (d) many applications may require, for privacy reasons, that the proof be generated without requiring access to the content of message M.

Before we discuss our solution, we take a moment to describe trusted timestamping. There are commercial software packages, service providers and multiple standards for certified timestamping such as ANSI ASC X9.95, EPCM (also called a digital postmark) etc. To obtain a certified timestamp for some information, an information owner sends the hash of the information to a Time Stamping Authority (TSA) who appends the current timestamp to the hash and digitally certifies the resulting hash+timestamp. Let I stand for any information, hI for the hash of the information and Chit stand for the certified hash of I at time t.

It is tempting to think that such a certified timestamp of message M (ChMt) created before locking the message can serve as an attestation that message M has not been modified while it remained locked. However, such a solution will not work for the following reasons:

A certified timestamp is a proof of content at a certain time and hence a guard against modification whereas event-locking is a guard against both access and modification. ChMt can be used to prove that M has not been modified since time t but does not say when M was locked from access.

Alternatively, a certified timestamp of the locked message LM, ChLMt, can prove that M had been locked by time t and has not been modified since, but does not say when LM was locked from access.

Since hM is recoverable from ChMt, if the locked message is easily guessable (say, predicting the winner of a Superbowl game, where there are only two possibilities), then an antagonist can compute the hash for all possibilities and see which hash matches hM and therefore guess M (a well-known attack called a rainbow attack). Even if the message is more complex, we note that, if the message stays locked for several years, an antagonist has a long time to try out many possibilities, do so without the fear of being throttled, and potentially with faster processors of future years.

Our solution involves adding additional information to a locked file. While additional information can be added to a file in many ways (as metadata, by appending additional data to the end of the file etc.), a simpler solution is to think of the locked file as a file module—i.e., a directory of files or even a zip file directory. A module enables us to keep additional information as separate files without affecting the file that contains the original message. It must be noted that file modules are purely a descriptive and implementation convenience, and not a necessary or integral part of this invention.

Before locking a message M, EL 412 creates a message module MM and places the message M in it. It then sends hash hM of M to Attestor 414. hM can be created using any suitable hash function such as the SHA family of functions recommended by NIST. In return, Attestor 414 provides 412 with two pieces of information: a certified timestamp ChMt and a random string called "gravel":

Timestamped certificates were described earlier. The Attestor may generate a certified timestamp using inhouse software or obtain it from an external third party.

Gravel is a random string that may be anywhere from 1K to 16K bytes. The purpose of gravel is to ensure that an antagonist cannot guess the content of a locked message by attacking the attestation. When a message is short (such as the prediction of the winner of a game), an antagonist can generate a locked module with all possible values for the winner, hash it, and see which hash the attestation matches. Salting is one common way to thwart this kind of attack (rainbow attack). However, salts are typically a fixed length, plaintext string often used in hashing passwords. Password attacks also have a backup defense mechanism in throttling. But locked messages can be long-lived, and an attacker has a long time to attack a certificate without fear of being throttled, potentially with faster processors of the future. A long random string of unknown length means that even if an attacker manages to guess the content of the message, since the attacker does not know the length of the gravel, the attacker cannot definitively conclude that a guess matches the message locked in LMM. A different guess could match the same hash with a gravel of different length. Length of the gravel increases the difficulty of guessing, but not knowing the length makes any guess uncertain.

Figure 8A:
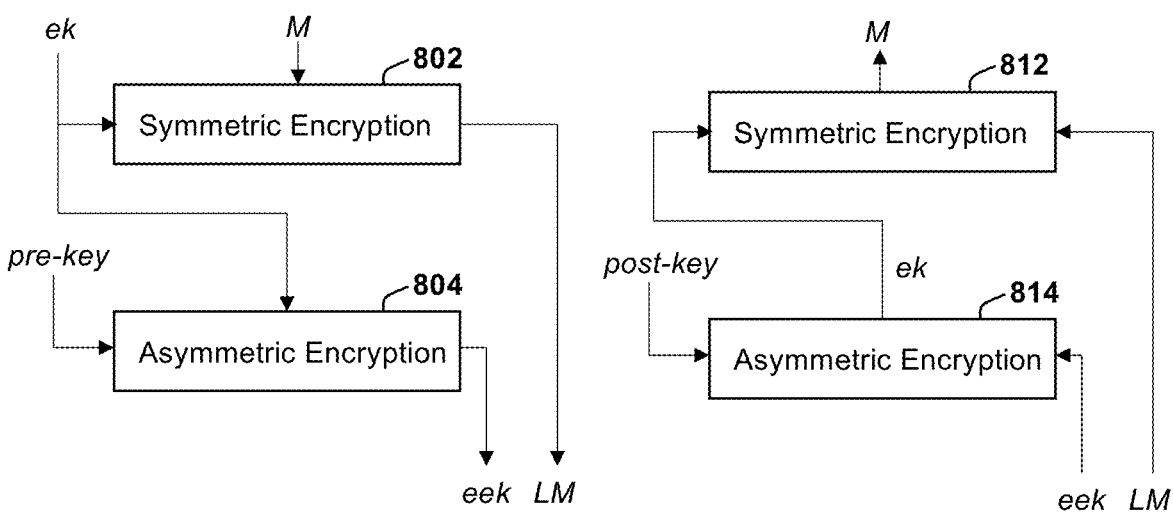
FIG. 08A depicts the 2-stage event locking and unlocking process.
Figure 8B:
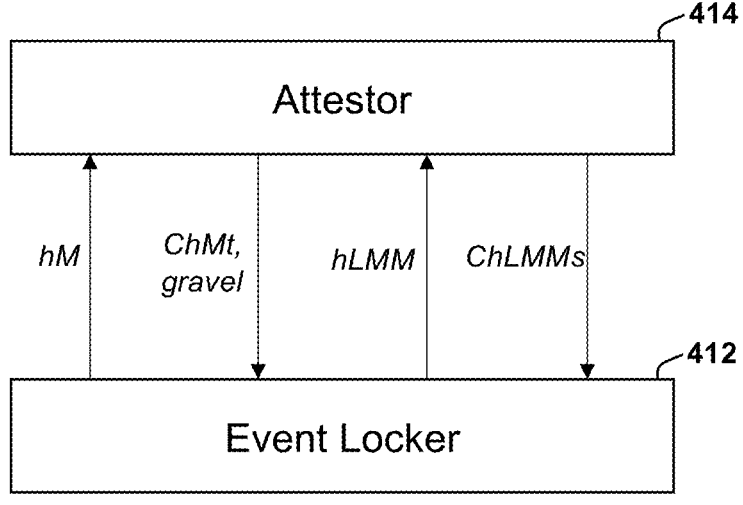
FIG. 08B depicts the flow between Event Locker 412 and the Attestor 414.

EL 412 places hM, ChMt and gravel in MM, locks it with the process outlined in FIG. 08A, generating Locked MM (LMM) and event-encoded encryption key eek. Now, EL 412 sends Attestor 414 a hash of LMM (hLMM) for which Attestor 414 provides a time-stamped certificate for time s (ChLMMs). The interaction between the Event Locker 412 and Attestor 414 is depicted in FIG. 08B. In some embodiments, EL 412 may create a new Locked Message Module with Attestation (LMMA) that contains all the (meta) information for an unlocker to open and verify the event-locked message M, as in FIG. 09 (B). Content of metadata.txt is shown in FIG. 10.

Figure 11:
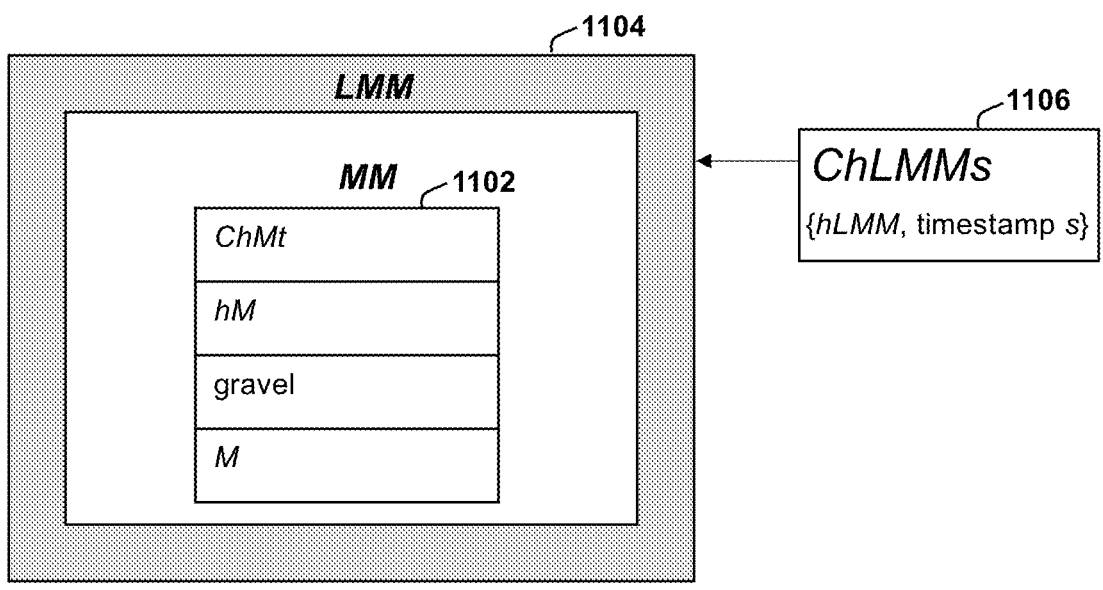
FIG. 11 depicts the relationship between MM, LMM and ChLMM.

FIG. 11 provides a summary: M, the message-to-be-locked, is placed in a message module MM 1102 along with its hash hM and certified timestamp ChMt, proving that M had the content certified by hM at time t. Further, since ChMt is placed inside MM, MM could not have been locked at time t. MM is then encrypted with ek to obtain LMM 1104. Now LMM is hashed, and this hash is certified and timestamped, providing ChLMMs (1106) with a timestamp for time s. So, an unlocker of LMM can be certain that:

1. ChLMMs is a certified hash of LMM at time s, which means LMM existed at time s, which in turn means that MM had been locked by time s.
2. ChMt is contained within LMM and has a timestamp for time t, which means that MM had not been locked by time t.
3. Therefore, MM (as well as M) must have been locked between t and s; the smaller time interval {t, s}, the more precisely the locking time of M is established.
4. If the hash of M tallies with ChMt, then the content of M has not been altered since t and therefore s, since t≤s.

The ChLMMS generated by the Attestor 414 fulfills all the four conditions that we set out in para [0037]:

1. With hashing, hLMM and hM respectively so that the slightest alteration of LMM or M will result in different hashes.
2. A long, variable-length gravel not only makes it difficult for an attacker to guess the message M from hLMM, but also make any guess uncertain and unprovable because the attacker does not know the length of the gravel.

3. The certified timestamp of M (ChMt) inside the unlocked MM and the certified timestamp of LMM (ChLMMs) together provide an irrefutable time interval for the lock time of the message.
4. Finally, the Attestor 414 does not need any access to the content of the message M, only a hash of M and a hash of locked message module LMM. An application or event client can lock a message by implementing the functions of Event Locker 412 internally and use Attestor 414 for generating the attestation without ever revealing M to Attestor 414.

EMBODIMENTS OF THIS INVENTION

So far, we have described the functional components of ELS with FIGS. 05, 06 and 07, indicating several configuration possibilities. Below, we describe specific embodiments to show how different configurations support different usage scenarios and result in different tradeoffs.

Embodiment V

Embodiment V is simply the standalone, monolithic ELS depicted in FIG. 05 (A). Here an application may register one or more events with ELS. To event-lock a message M, the application passes the message M and an event token t to ELS and receives a locked message module LMM and a timestamped ChLMMs as the attestation.

This embodiment is simple but requires trust between the application and ELM and is most useful when the purpose of event locking is to guard some information from an antagonist that's outside the system, or to establish credibility that the event had remained locked until a certain time. Even with trust between the application and ELS, the attestation is still a valuable tool for proving to a third party that a message remained locked and has not been altered since.

Embodiment W

Figure 12:
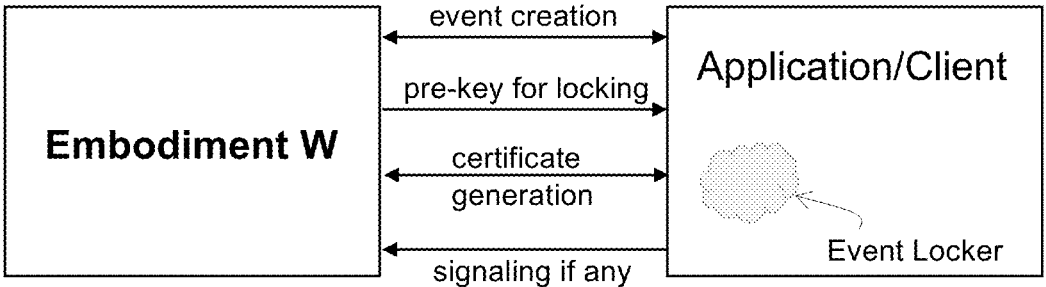
FIG. 12 depicts the flow between Embodiment W and an application to generate an attestation.

Embodiment W, shown in FIG. 12 is similar to W, except that the target application, rather than the ELS, performs Event Locking (i.e., the job of Event Locker 412). The application may create events, and either the application or a third party may unlock events. The application uses the 2-step process shown in FIG. 08A to event-lock a message, and the process shown in FIG. 08B to generate the attestation. ELS may provide libraries or SDKs (software development kits) that an application may use to aid in event locking and unlocking.

Embodiment W represents a common situation where the ELS is provided by a reputed organization and applications have no problem of trust with the ELS. However, the message M to be locked may involve customer data or other sensitive data that needs to remain private, and the locked data may need to stay locked for regulatory or other reasons (such as preserving it for a year-end audit) with an attestation proving that the data has not been tampered with. As an example, consider a scenario where a government agency is calling for sealed tenders from contractors. A reputable company such as Deloitte or IBM may provide event management services such as event registration, Timelocks, and the event's pre- and post-keys. A desktop application, operated locally by the contractors, may provide event locking such that a tender from a contractor is locked before it is shipped to the government agency, where all tenders become unlocked at the same time when the post-key of the event is released.

Embodiment X

Figure 13:
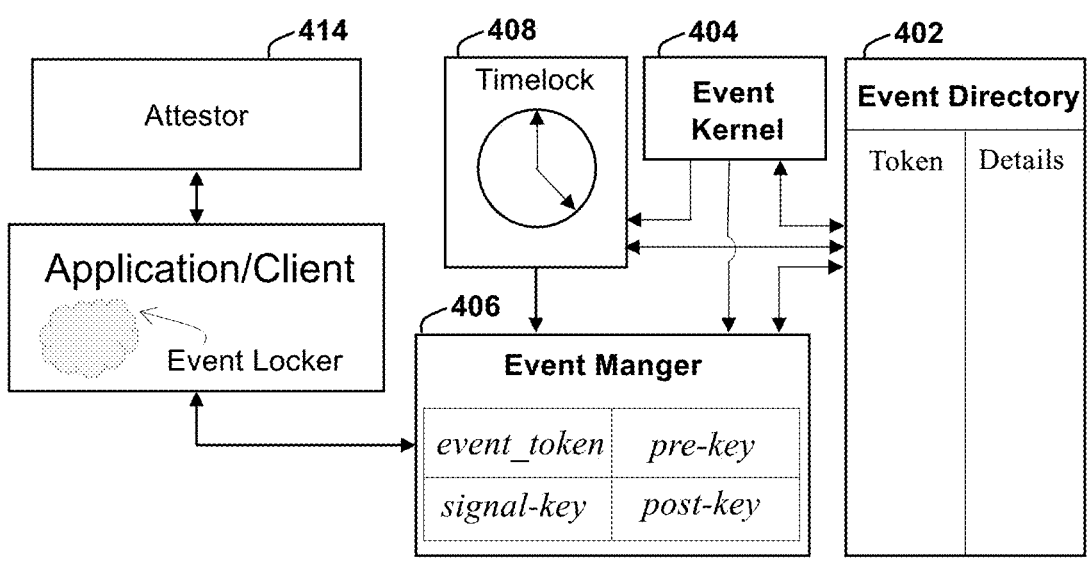
FIG. 13 depicts Embodiment X.

Embodiment X, shown in FIG. 13 is a distributed embodiment where every functional component of ELS is also a separate structural component or distributed application (dApp) interacting with other components via clearly defined APIs. Not surprisingly, Embodiment Y is structurally very similar to the functional components shown in FIG. 04.

In this embodiment, it may be assumed that the operations of all the components are transparent, and all source code is open and/or documented. As in Embodiment W, the Event Locker is integrated into the application or event client, say, in the form of a library or SDK. Events are registered through the event kernel which is the only component that has access to the post-key before the event is signaled. Assuming that the event kernel can be isolated and trusted, the rest of the components cannot "cheat" without the collusion of at least one other component. For example, the Event Manager 406 cannot release the post-key without receiving an encryption key from the Timelock 408 (or the event-owner) and vice versa. With the event locker integrated into the application, the application does not have to reveal the message M that it locks—only its hash; and the Attestor 414 does not need M to generate the attestation.

This embodiment may be adequate for the sports betting scenario introduced earlier. Bookmakers can create event tokens for sports prompts (e.g., who will win the game between the Packers and the Lions on such-and-such date); betting customers or custodial applications that represent betting customers can invoke the event locker to lock the bets and provide certificates of their bets to the bookmaker. The bookmaker cannot open the bets until after the event occurs, nor can the bookmaker deny or a reject a bet that provides a valid certificate.

Embodiment Y

A weak link in Embodiment X is the Event Kernel EK 404 since it is one component that has access to the post-key before the event occurs. A compromised EK can compromise the entire event-locking process by revealing the post-key to an antagonist before the event is signaled or even providing random pre-keys that have no corresponding post-keys. This can happen either because the event kernel is controlled by an agent trying to undermine Embodiment Y or because EK 404 has been hacked by a potential saboteur. One solution is to split the responsibility for the generating an asymmetric cryptographic keypair between two or more event kernels. There are many known techniques for multi-party RSA key generation (generally called threshold cryptography). Since these are well established in prior art, here we consider a different approach.

To fight against these types of attacks, Embodiment Y provides multiple instances of each component for an application to choose from. This means that an antagonist cannot compromise the integrity of Embodiment Y by compromising just a few instances here and there. In the limit, an antagonist has to compromise a majority of instances to be sure that any event-locked message can be attacked or opened before its event has occurred.

Figure 14:
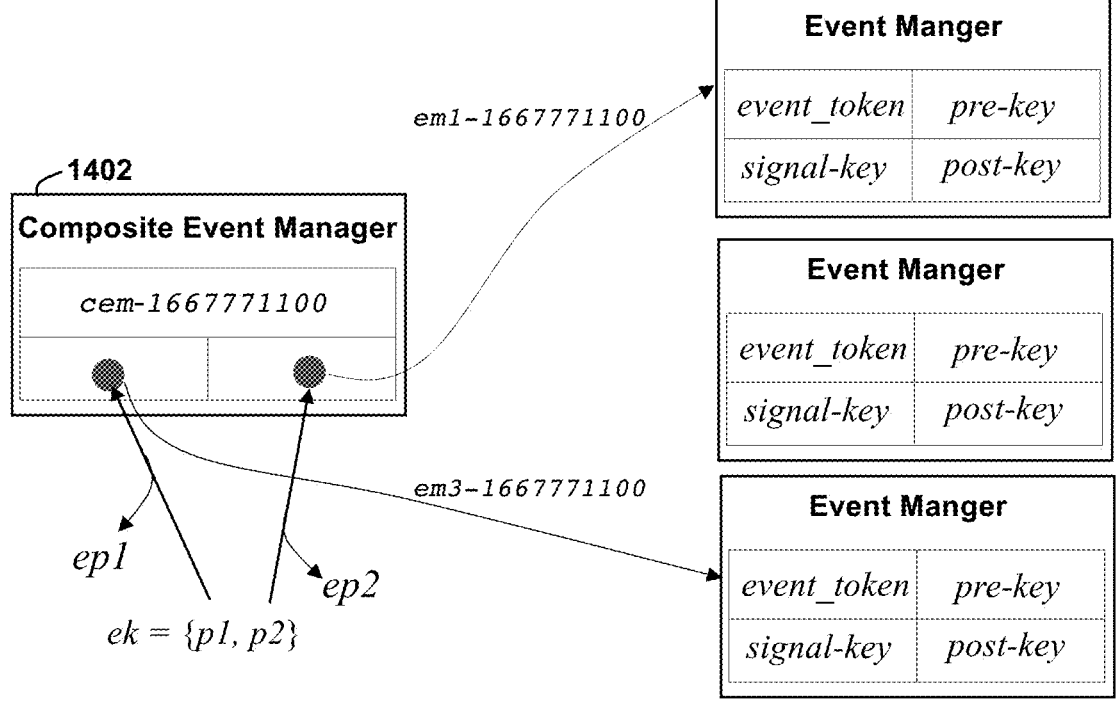
FIG. 14 depicts a Composite Event Manager of Embodiment Y.

Embodiment Y also provides one or more Composite Event Managers CEM 1402 that creates composite events by combining events from multiple instances of EM 406. To register an event for say, noon tomorrow, CEM 1402 registers the same event through two or more EK 404s that place their event keys with two or more EM 406s controlled by two or more Timelocks 408s. For simplicity, let us assume that a given composite event is constituted from two simple events, as depicted in FIG. 14: CEM 1402 maintains its own event token cem-1667771100 for the composite event, which in turn is composed from two event tokens em1-1667771100 and em3-1667771100 from different instances of Event Manager EM 406.

To event-encode a message (typically an encryption key) ek, CEM 1402 takes ek, splits it randomly into two parts p1 and p2, encodes p1 with em3-1667771100 and p2 with em1-1667771100, creating a two-part encrypted ek, as in eek={encode (em3-1667771100, p1), encode (em1-1667771100, p2)}={ep1, ep2} where ep1 and ep2 are encrypted versions of p1 and p2 respectively. This is shown in FIG. 14.

To decode the two-part eek, CEM 1402 decodes the two parts separately with their respective simple event tokens and concatenates the result to recreate ek as in ek=concatenate (decode (em3-1667771100, ep1), decode (em1-1667771100, ep2)).

How is the event signaled? If the event is a timed event, the Timelocks controlling the simple events signal their respective events and CEM 1402 does not have any role to play. Alternatively, 1402 can act as an ombudsman, maintain its own Timelock and verify that the simple events are not signaled prematurely. If the event is a signaled event, then CEM 1402 registers the simple events by designating itself as their event owner and providing the real event owner a new signal key with which the real event owner can signal the occurrence of the event to CEM 1402; in response, 1402 signals the simple events with their respective signal keys.

There is no change in the attestation process. Given an LMM locked with a composite event, the Attestor 414 performs the same functions described under "Message Attestation" to obtain ChLMMs.

CEM 1402 of Embodiment Y provides a defense against a rogue Event Kernel or other compromised components in multiple ways: replication of components ensures that an antagonist cannot easily target a specific event easily since the antagonist cannot know in advance which specific instances may be involved in implementing an event. The Composite Event Manager CEM 1402 ensures that a compromised Event Manager 406 or Timelock 408 can be defended against by combining the forces of multiple event managers. A rogue Timelock 408 firing too soon or releasing the encryption key for its post-key prematurely is rendered impotent by other Timelocks that control other simple events that are part of the composite event. Unless multiple instances involved in a composite event (multiple event kernels, multiple event managers, multiple timelocks) collude, a message that is locked with a composite event cannot be broken prematurely. As the number of instances for each component in an embodiment increases linearly, the difficulty of compromising event-locking in Embodiment Y increases exponentially.

It is also worth addressing the problem of nuisance makers or saboteurs. Specifically, what if an event kernel is compromised in the sense that it dishes out pre-keys and post-keys that are random strings and not a complementary asymmetric keypair? This problem may be addressed in any embodiment by requiring the event kernel to respond to a test string. Specifically, on event registration, the event owner provides a random test string, say, "why the sea is boiling hot and whether pigs have wings," which the event kernel is expected to encrypt with the post-key and return. Since the pre-key is public, the event owner can decrypt the post-key-encrypted test phrase with the pre-key to recover the test phrase; if this fails, then the event owner knows that the pre-key is not legitimate and can move on to a different event-kernel.

While Embodiment X may have been an adequate solution for many event-locking scenarios such as the sports betting problem, Embodiment Y and forthcoming Embodiment Z can provide an even more robust and credible solution.

Embodiment Z

Embodiment Z builds on Embodiment Y by providing a public logging facility where each component logs its operation. FIG. 15 depicts log entries 1502, 1504 and 1506 created by Event Kernel 404, Event Manager 406 and Timelock 408 when an event is registered. Assume that all the entries have a timestamp and are signed by their respective creators (not shown in FIG. 15). Such log entries simply record that certain actions were taken by certain components and can be used to ascertain that the components are performing as they are expected to.

Compare the above to log entries 1602 and 1604. In 1602, the Timelock signals the occurrence of an event and provides a signed encryption key to EM 406 and receives a signed acknowledgment from EM 406. Unlike log entries in FIG. 15 which simply serve to record the operations of the components, the log-entries in FIG. 16 record the handing off of responsibility and absolution. The Timelock 408 indicates that its responsibility is over when it handed over the encryption key to EM 406 and logs a signed acknowledgment from EM 406 to prove it. Similarly, in 1604, EM 406 absolves itself for releasing the post-key by exhibiting the signed encryption key it received from the Timelock. Thus, with 1604, EM 406 absolves itself, pinning the responsibility for the release of the post-key on Timelock 408.

A properly constructed logging structure can act as an audit trail that serves multiple purposes. Going back to our sports betting example, the log can serve as a check that the components are performing as expected; it can be used by the bookmaker to establish credibility for oneself; it can be used to detect fraudulent behavior on either the bookmaker's part or a bettor's part; it can serve as a dispute resolution mechanism between bettors and a bookmaker should one arise; finally, an open and public log can act as a disincentive for any rogue behavior on the part of any component or its underlying human agents. Such a log may also be implemented using a blockchain where each log element is a block that is hash-linked with previous and subsequent blocks, making it difficult to refute or falsify a log entry.

Glossary

| Antagonist | Any person or app with an incentive to unlock an event-locked message before its event occurs. More generally, an antagonist is one who has an incentive to undermine an event-locking system in some way. |
|---|---|

14

-continued

| Application | An application is any computer program that uses the event-locking system in any way, including event creation, signaling, logging, event-locking etc. |
|---|---|
| Asymmetric keypair | Two cryptographic keys such that information encrypted by one key can (only) be decrypted by the other. We assume RSA technique in our examples, but any pair of keys exhibiting this relationship can be used for event locking. |
| dApp | A distributed application, typically operating as an independent process with its own identity and with well-defined API interfaces; typically, an abstraction for a business process operated by some agent. |
| Event Client | Event client is an application as well, but the term is used more narrowly to refer to an application that uses ELS to lock messages to events. |
| Event Token | A unique token or string by which a simple or a composite event may be identified. |
| Locked to an event/event-token | A message locked to or by an event if the message or its encryption key is encrypted by the pre-key of the event and can only be unlocked by the post-key of the event |

REFERENCES

1. Rivest, Ronald L., Shamir, Adi, and Wagner, David A., "Time-lock Puzzles and time-release Crypto," Technical Report, MIT, 1996.
2. Bellare, Mihir, and Goldwasser, Shafi, "Verifiable partial key escrow," Proc. of the 4$^{th}$ Conference on Computers and Communications Security, 1997.
3. Mahmoody, M., Moran, T., Vadhan, S. (2011). Time-Lock Puzzles in the Random Oracle Model. In: Rogaway, P. (eds) Advances in Cryptology—CRYPTO 2011. CRYPTO 2011. Lecture Notes in Computer Science, vol 6841. Springer, Berlin, Heidelberg, 2011.
4. Liu, Jia, Jager, Tibor, Kakvi, Saqib A., and Warinschi Bogdan, "How to build time-lock encryption," vol. 86, issue 11, ACM Digital Library, 2018.
5. Smith, Wesley, "Towards Timelock Encryption," Technical Report, University of Ediburgh School of Informatics, 2019.
6. Jaques, S., Montgomery, H., Rosie, R., Roy, A. (2021). Time-Release Cryptography from Minimal Circuit Assumptions. In: Adhikari, A., Küsters, R., Preneel, B. (eds) Progress in Cryptology—INDOCRYPT 2021. INDOCRYPT 2021. Lecture Notes in Computer Science, vol 13143. Springer, 2021.
7. Fletcher, John, "Methods and systems for blockchain-implemented event-lock encryption," US Patent U.S. Ser. No. 11/159,313B2, 2021.

The invention claimed is:

1. A system configured to perform event-based message locking, wherein messages are locked by encryption and prevented from decryption until a predetermined event has occurred, the system comprising one or more network-connected processors coupled to non-transitory computer-readable storage media storing program instructions that, when executed, cause the processors to execute at least three applications, including a first application, a second application, and a third application, wherein:

the first application is configured to:
associate a predetermined event with a unique event identifier ("event identifier");
associate, with the event identifier, a pair of asymmetric cryptographic keys called a first key and a second key, wherein the first key and the second key are mathematically related, and a message encrypted using the first key is decryptable using the second key;

encrypt the second key using a randomly generated lock key;

transmit the lock key to the second application; and transmit the first key and the encrypted second key to the third application; and the second application is configured to:

receive the lock key from the first application; and transmit the lock key to the third application in response to receiving a signal key from a computer program designated as an oracle for recognizing the occurrence of the predetermined event; and the third application is configured to:

receive the first key and the encrypted second key from the first application;

dispense the first key in response to requests for the event identifier's first key; and subsequent to receiving the lock key from the second application:

decrypt the encrypted second key using the lock key to obtain the event identifier's second key; and dispense the second key in response to requests for the event identifier's second key.

2. The system of claim 1, wherein the first application is further configured to:

designate a computer application as an oracle for recognizing the occurrence of the predetermined event; and provide the oracle with a signal key for signaling the occurrence of the predetermined event.

3. The system of claim 1, wherein the program instructions further cause the processors to execute a fourth application configured to:

receive a message M and an event identifier;

encrypt M using a randomly generated encryption key EK to obtain a locked message LM;

request and receive the event identifier's first key from the third application; and encrypt EK using the event identifier's first key to generate an event-locked encryption key EEK.

4. The system of claim 1, wherein the program instructions cause the processors to further execute a fourth application configured to:

receive a locked message LM, an event identifier, and an event-locked encryption key EEK, wherein EEK comprises a randomly generated encryption key EK encrypted using the event identifier's first key;

request and receive the event identifier's second key from the third application;

decrypt EEK using the event identifier's second key to obtain EK; and decrypt LM using EK.

5. The system of claim 1, wherein the program instructions cause the processors to further execute a fourth application configured to:

receive a message M and an event identifier;

generate a message module MM comprising:

M;

hM, a message digest of M created using a predetermined hash function; and

ChMt, a certified timestamp of hM at time t, created using a predetermined certified timestamping algorithm;

encrypt MM using a randomly generated encryption key EK to obtain a locked message module LMM;

request and receive the event identifier's first key from the third application;

encrypt EK using the event identifier's first key to obtain an event-locked encryption key EEK; and generate a locked message module LMMA comprising:

LMM;

hLMM, a message digest of LMM created using a predetermined hash function;

ChLMMs, a certified timestamp of the hLMM at time s, created using a predetermined certified timestamping algorithm; and

EEK.

6. The system of claim 1, wherein the program instructions cause the processors to further execute a fourth application configured to:

receive an event identifier and a message module LMMA locked to the event identifier, wherein LMMA comprises:

a message module LMM;

hLMM, a message digest of LMM created using a predetermined hash function;

ChLMMs, a certified timestamp of the hLMM at time s, created using a predetermined certified timestamping algorithm; and EEK, an event-locked encryption key created by encrypting a randomly generated encryption key EK using the event identifier's first key;

verify that ChLMMs certifies hLMM and time s;

verify that hLMM is a message digest of LMM created using the predetermined hash function;

request and receive the event identifier's second key from the third application;

decrypt EEK using the event identifier's second key to obtain EK;

decrypt LMM using EK to obtain a message module comprising:

a message M;

hM, a message digest of M; and

ChMt, a certified timestamp of hM at time t;

verify that ChMt certifies hM and time t;

verify that hM is a message digest of M generated using the predetermined hash function;

verify that time t temporally precedes time s; and generate a certification record indicating that M was locked between time t and time s and has not been altered since.

7. The system of claim 1, wherein the predetermined event is an occurrence of a predetermined absolute time, the predetermined absolute time represented using one of a plurality of time representations.

8. The system of claim 7, wherein the designated oracle comprises a plurality of timelocks, and the designated oracle transmits the signal key to the second application after receiving, from at least a predetermined number of the plurality of timelocks, release signals indicating that the predetermined absolute time has been reached or exceeded.

9. The system of claim 1, wherein the program instructions further cause the processors to record digitally signed, timestamped log entries associated with the event identifier in a tamper-evident log, wherein each log entry is hash-linked to a preceding log entry.

10. A computer-implemented method for facilitating event-based message locking and unlocking, the method comprising:

associating a predetermined event with a unique event identifier ("event identifier");

associating with the event identifier, a pair of asymmetric cryptographic keys called a first key and a second key, wherein the first key and the second key are mathematically related, and a message encrypted using the first key is decryptable using the second key;

encrypting the second key using a randomly generated lock key;

transmitting the lock key to a trusted application configured to maintain exclusive control of the lock key until the trusted application receives, from a designated oracle, a signal indicating that the predetermined event has occurred;

dispensing the first key in response to requests for the event identifier's first key; and subsequent to the trusted application receiving, from the designated oracle, the signal indicating that the predetermined event has occurred:

decrypting the encrypted second key using the lock key to obtain the event identifier's second key; and dispensing the second key in response to requests for the event identifier's second key.

11. The method of claim 10 further comprising:

receiving a message M and an event identifier;

encrypting M using a randomly generated encryption key EK to obtain a locked message LM; and encrypting EK using the event identifier's first key to obtain an event-locked encryption key EEK.

12. The method of claim 10 further comprising:

receiving a locked message LM, an event identifier, and an event-locked encryption key EEK, wherein EEK comprises a randomly generated encryption key EK encrypted using the event identifier's first key;

decrypting EEK using the event identifier's second key to obtain EK; and decrypting LM using EK.

13. The method of claim 10 further comprising:

receiving a message M and an event identifier;

generating a message module MM comprising:

M;

hM, a message digest of M created using a predetermined hash function; and

ChMt, a certified timestamp of hM at time t, created using a predetermined certified timestamping algorithm;

encrypting MM using a randomly generated encryption key EK to obtain a locked message module LMM;

encrypting EK using the event identifier's first key to obtain an event-locked encryption key EEK; and generating a locked message module LMMA comprising:

LMM;

hLMM, a message digest of LMM created using a predetermined hash function;

ChLMMs, a certified timestamp of the hLMM at time s, created using a predetermined certified timestamping algorithm; and

EEK.

14. The method of claim 10 further comprising:

receiving an event identifier and a message module LMMA locked to the event identifier, wherein LMMA comprises:

a message module LMM;

hLMM, a message digest of LMM created using a predetermined hash function;

ChLMMs, a certified timestamp of the hLMM at time s, created using a predetermined certified timestamping algorithm; and EEK, an event-locked encryption key created by encrypting a randomly generated encryption key EK using the event identifier's first key;

verifying that ChLMMs certifies hLMM and time s;

verifying that hLMM is a message digest of LMM created using the predetermined hash function;

decrypting EEK using the event identifier's second key to obtain EK;

decrypting LMM using EK to obtain a message module comprising:

a message M;

hM, a message digest of M; and

ChMt, a certified timestamp of hM at time t;

verifying that ChMt certifies hM and time t;

verifying that hM is a message digest of M created using the predetermined hash function;

verifying that time t temporally precedes time s; and generating a certification record indicating that M was locked between time t and time s and has not been altered since.

15. The method of claim 10, wherein the signal received from the designated oracle comprises a signal key.

16. The method of claim 10, wherein the predetermined event is an occurrence of a predetermined absolute time, and wherein the designated oracle comprises a plurality of timelocks, and the designated oracle transmits the signal after receiving, from at least a predetermined number of the plurality of timelocks, release signals indicating that the predetermined absolute time has been reached or exceeded.

17. The method of claim 10, further comprising recording digitally signed, timestamped log entries associated with the event identifier in a tamper-evident log, wherein each log entry is hash-linked to a preceding log entry.

18. The method of claim 10, wherein the predetermined event is an occurrence of a predetermined absolute time, the predetermined absolute time represented using one of a plurality of time representations.

\* \* \* \* \*